US011938604B2

(12) United States Patent
Foley et al.

(10) Patent No.: US 11,938,604 B2
(45) Date of Patent: Mar. 26, 2024

(54) APPAREL REPAIR TOOL AND KIT

(71) Applicants: Amelia Foley, Houston, TX (US); Thomas Foley, Houston, TX (US)

(72) Inventors: Amelia Foley, Houston, TX (US); Thomas Foley, Houston, TX (US)

( * ) Notice: Subject to any disclaimer, the term of this patent is extended or adjusted under 35 U.S.C. 154(b) by 0 days.

(21) Appl. No.: 18/065,666

(22) Filed: Dec. 14, 2022

(65) Prior Publication Data

US 2023/0219205 A1 Jul. 13, 2023

Related U.S. Application Data

(60) Provisional application No. 63/297,837, filed on Jan. 10, 2022.

(51) Int. Cl.
*B25C 5/02* (2006.01)
*A41H 37/10* (2006.01)

(52) U.S. Cl.
CPC ........... *B25C 5/0207* (2013.01); *A41H 37/10* (2013.01); *B25C 5/025* (2013.01)

(58) Field of Classification Search
None
See application file for complete search history.

(56) References Cited

U.S. PATENT DOCUMENTS

| | | | | | |
|---|---|---|---|---|---|
| 1,410,560 | A * | 3/1922 | Latham | A43D 100/08 | 221/72 |
| 1,486,870 | A * | 3/1924 | Elliott | A41H 37/10 | 112/475.15 |
| 2,506,038 | A * | 5/1950 | Rakusin | B25C 5/025 | 227/31 |
| 2,786,201 | A * | 3/1957 | Ehrlich | A41H 37/005 | 227/124 |
| 4,262,836 | A * | 4/1981 | Hirose | B29C 66/45 | 112/2 |
| 4,281,785 | A * | 8/1981 | Brooks | B29C 66/81811 | 156/92 |
| 4,550,870 | A * | 11/1985 | Krumme | A61B 17/072 | 227/129 |
| 4,925,082 | A * | 5/1990 | Kim | B25C 5/025 | 227/120 |
| 2018/0117750 | A1* | 5/2018 | Thiyagarajan | B25C 5/1689 | |
| 2021/0237247 | A1* | 8/2021 | Fish | B25C 5/1689 | |

* cited by examiner

*Primary Examiner* — Tanzim Imam
(74) *Attorney, Agent, or Firm* — Brennan, Manna & Diamond, LLC

(57) ABSTRACT

The present invention relates to a novel apparel repair tool. The device is an adjustable tool for replacing buttons, fasteners or other adornments. The device includes a handle component featuring a transparent window, hammer, magazine, spring, and pusher. The transparent window allows users to see the quantity and type of staples within. The tool has a base with moveable bars, a button receiving area, and a crimper. The movable bars allow the user to adjust for the replacement of buttons or fasteners of different sizes.

9 Claims, 7 Drawing Sheets

APPAREL REPAIR TOOL AND KIT

CROSS-REFERENCE TO RELATED APPLICATION

The present application claims priority to, and the benefit of, U.S. Provisional Application No. 63/297,837, which was filed on Jan. 10, 2022 and is incorporated herein by reference in its entirety.

FIELD OF THE INVENTION

The present invention relates generally to the field of clothing and apparel repair tools and accessories. More specifically, the present invention relates to a button, closure or fastener stapler that allows users to temporarily staple or otherwise secure a button, clasp, fastener, adornment or other element to an apparel item or article of clothing missing a closure or other accessory until a more permanent repair can be made. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in clothing or apparel repair tools and accessories. Specifically, the tool allows for temporary repair to replace missing fasteners, adornments or other items which one may find on apparel or apparel accessories. Tools and other mending kits are often used for quick and easy button replacement and are generally desired in the art because they allow users to replace a missing button on a garment without the need to use a needle and thread before a more permanent repair can be made.

Another problem is that traditional button replacement when using a needle and thread requires some level of sewing skill. This invention allows every user, with or without traditional sewing skills, to repair their garments quickly and easily.

Specifically, the present invention relates to a clothing repair tool or kit that allows users to staple or otherwise affix a missing button, fastener, adornment or other accessory back onto a garment or apparel item before a more permanent repair can be made. The invention works similar to that of a stapler and features textured staples or fasteners that can be colored to resemble thread so as to not stand out due to a significant color difference between the fastener or staple and the apparel or garment to which the tool is being used.

Therefore, there exists a long-felt need in the art for a clothing or apparel repair tool that provides users with the ability to reattach buttons, snaps, fasteners, adornments or other accessories to articles of clothing, apparel or other garments when a needle and thread are not readily available. There is also a long-felt need in the art for a clothing or apparel repair tool or kit that allows users without traditional sewing skills to reattach buttons, snaps, clasps, zippers, fasteners, adornments and other accessories to articles of clothing or apparel. Further, there is a long-felt need in the art for an apparel or garment stapler that includes staples or other fasteners that resemble thread to make the repair unnoticeable.

The subject matter disclosed and claimed herein, in one embodiment thereof, comprises an apparel repair tool. The device is a clothing or apparel accessory that allows users to quickly and easily reattach missing buttons, snaps, clasps or other fasteners, as well as adornments. The present invention is similar to a traditional office product type of stapler in function and design but with modifications in order for the tool to function as an apparel repair accessory. The tool has a top portion and a bottom portion which are moveably connected to one another by a hinge and the top and bottom portion are biased away from one another by a spring disposed near the hinge. The top portion includes a reservoir area for holding the fasteners or staples and a spring-loaded plunger which moves the staples or fasteners forward to an end point of the top portion. An insertion plunger is included in the top portion to? insert individual staples or fasteners into the button or other fastener to then affix the button to the apparel item or garment.

Continuing with the present embodiment, the device features a crescent-shaped button receiving area on the working end with alignment pins to align the button or other item to be affixed to the garment properly. Movable bars or arms hold the button, fastener or other item to be applied in position during the repair process. The tool includes a plurality of thin-textured staples or other fasteners that resemble thread to make the repair less conspicuous so that the staples or affixing fasteners more readily blend in with the garment to which the repair is being made. A transparent window allows users to see what color staples or fasteners are inside as well as the amount of remaining staples or fasteners that are left. The device is adjustable to fit small, medium, and large button sizes, as well as other items that may need to be affixed. The alignment pins slide to accommodate the different sizes of button, clasps, snaps, other fasteners or adornments.

In another embodiment, a kit is provided and includes a package configured for retail or on-line sales. The package contains a tool which operates similar to staplers, a plurality of different colored or textured staples or other fasteners whether rigid or semi-rigid, as well as a supply of replacement buttons, clasps, snaps, adornments and other items which may be used to apply to garments and other apparel items.

In this manner, the apparel repair tool and kit of the present invention accomplishes all of the foregoing objectives and provides users with a device that allows users to quickly and easily reattach missing buttons, clasps, snaps, other fasteners and adornments without having to sew them to reattach the item to the garment. The invention allows a user to replace multiple sizes of buttons. The invention allows users to make seamless repairs with staples to match the existing threading on the garment.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a button stapler. The device is a clothing and apparel repair tool and kit for reattaching missing buttons, other fasteners and adornments quickly and easily. The tool is similar in function and design to a traditional stapler and includes a crescent-shaped button receiving area with centering or alignment pins and movable arms or bars to secure the button or other item in the proper position. The device is adjustable via the sliding or alignment pins to allow for multiple sizes of buttons. The tool has a top portion and a bottom portion which are moveably connected to one another by a hinge and the top and bottom portion are biased away from one another by a spring disposed near the hinge. The top portion includes a reservoir area for holding the fasteners or staples and a spring-loaded plunger which moves the staples or fasteners forward to an end point of the top portion. An insertion plunger is included in the top portion to? insert individual staples or fasteners into the button or other fastener to then affix the button to the apparel item or garment. The tool and kit features multiple colors and textures of staples or other fasteners to resemble the existing thread on the garment or apparel item. A transparent window allows the user to see which staples are loaded inside, as well as the amount of staples or fasteners remaining.

In one embodiment, the button portion of the stapler or affixer comprises a traditional hammer and anvil stapler configuration. Specifically, the tool features a handle with a transparent window to see which staples are within the tool and the amount of staples or other fasteners that are remaining. The handle has a hammer to drive the staples or other fasteners through the button of the housing of the upper portion and into the garment or apparel item. The handle features a magazine to hold the staples or other fasteners that is complete with a spring and pusher to push the loaded staples into the hammer area.

In one embodiment, the transparent window is manufactured from plastic, although any transparent material known in the art is deemed suitable for the purpose described may be used.

In one embodiment, the hammer, magazine, spring, and pusher of the stapler are manufactured from metal or other rigid material such as plastic.

In one embodiment, the handle component is comparable in size to the handle of a traditional office products stapler, although variations may arise through design and manufacturing.

In yet another embodiment, the handle component is manufactured from heat-sealable plastic or polymers, such as polypropylene or acrylonitrile-butadiene-styrene (ABS), or metals, such as aluminum, stainless steel, etc, although any material known in the art deemed suitable for the purpose described may be used.

In another embodiment, the apparel tool features a base component similar to that of a traditional stapler. The base component has first and second movable bars that adjust to keep buttons or other items to be attached to the garment of various sizes in place. The movable bars feature a button or other item receiving area that are crescent shaped. The base component also features a crimper on the bottom portion opposing the hammer of the upper portion of the handle. The crimper folds the staples or other fasteners onto the interior of the garment, securing the staples or fasteners in place.

In one embodiment, the staples or fasteners included with the button stapler of the present invention are of different sizes, colors, and textures to resemble thread. In one embodiment, the staples or fasteners are manufactured from metal, plastic or other thermoformable material, although any other material deemed suitable for the purpose described may be used.

In one embodiment, the crimper found on the base of the button stapler is manufactured from metal and is heated to bend the staples or fasteners when formed from a thermoplastic material.

In one embodiment, the base component is comparable in size to that of a traditional paper stapler, although variations may arise through design and manufacturing.

In yet another embodiment, the base component is manufactured from heat-sealable plastic or polymers, such as polypropylene or acrylonitrile-butadiene-styrene (ABS), or metals, such as aluminum, stainless steel, etc, although any material known in the art deemed suitable for the purpose described may be used. In yet another embodiment, the tool and kit includes a plurality of indicia.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
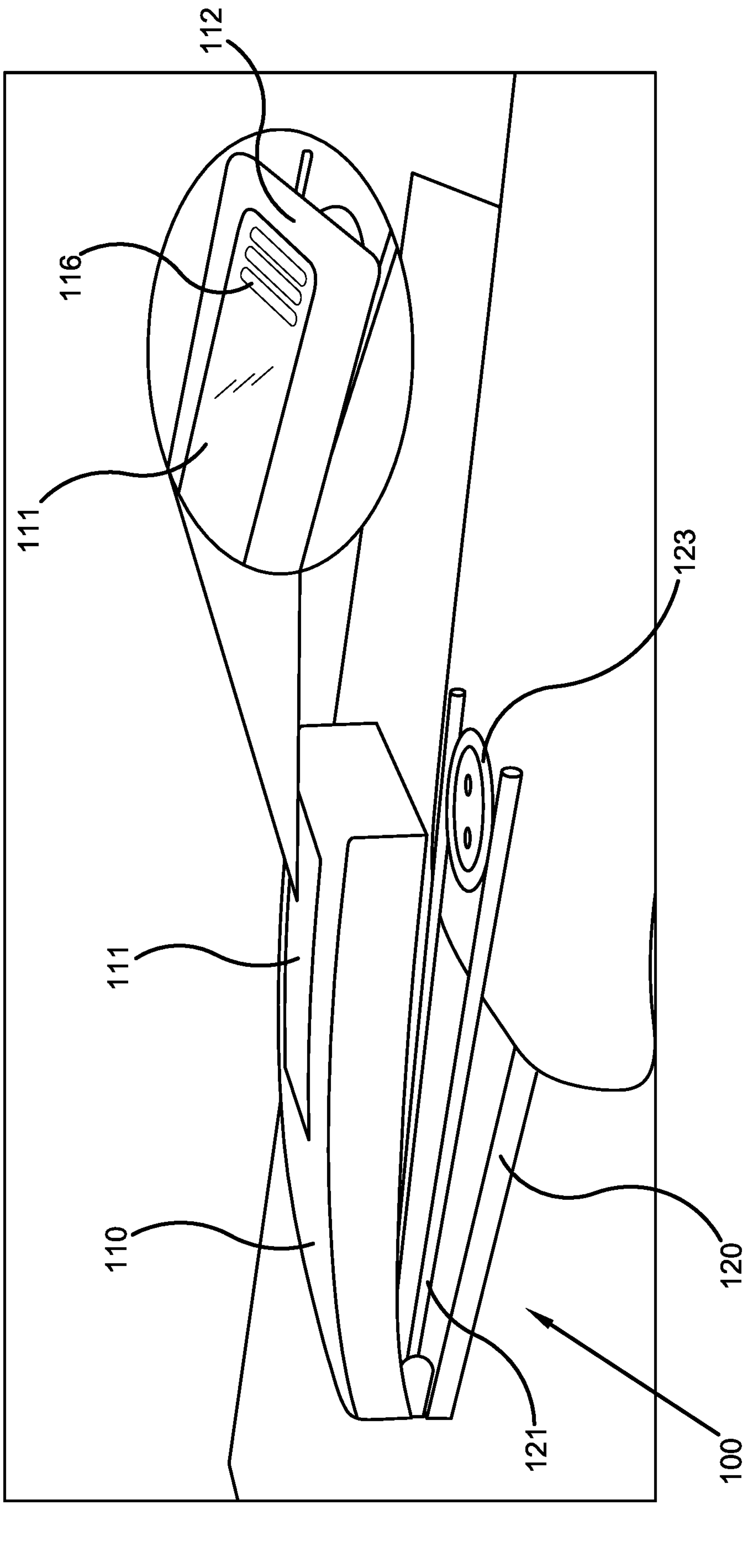
FIG. 1 illustrates a perspective view of one potential embodiment of the apparel repair tool of the present invention being used to reattach a button on a sleeve of a garment in accordance with the disclosed specification.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a clothing repair tool that allows for the quick and easy replacement of missing buttons, fasteners and other items such as aesthetic adornments. There is also a long-felt need in the art for a clothing or apparel repair tool that allows for the replacement of missing buttons or fasteners without having to use conventional sewing materials such as a needle and thread. Finally, there is a long-felt need in the art for an apparel repair tool that includes staples or other fasteners that resemble thread for an invisible repair.

The present invention, in one exemplary embodiment, is a novel apparel repair tool. The device is an adjustable tool for quickly and easily replacing missing buttons, fasteners and other items on various garments, apparel items or other accessories without the use of conventional sewing equipment, such as with a needle and thread. The device includes a base component complete with a staple crimper or former similar to that of a traditional paper stapler. The former or crimper may also be heated so that when plastic or other thermoformable materials are used, the ends of the staple or fastener may be formed around the fastener to help in holding the fastener to the apparel item. The base or lower component also features adjustable bars or arms that allow placement of buttons of different sizes. The apparel repair tool also includes a handle or upper component featuring a hammer, magazine, spring, and pusher similar to that of a traditional paper stapler. The handle or upper component of the tool also features a transparent window to view which staples are within the magazine and how many fasteners are remaining. The device also includes a variety of staples or other fasteners that are textured and colored to resemble different threads found in the garments to be repaired, allowing for a mostly unnoticeable button replacement.

Referring initially to the drawings, FIG. 1 illustrates a perspective view of one embodiment of the button stapler 100 of the present invention being used to reattach a button or other fastener on the sleeve of a garment or apparel items. In the present embodiment, the apparel repair tool 100 is a garment repair tool that is used to replace missing buttons, clasps, snaps, other fasteners and adornments. The device 100 is especially designed to allow any ? user as is known in the art to replace missing garment buttons and other apparel items without sewing skills or the availability of sewing tools.

More specifically, the device 100 includes a handle 110 with a transparent window 111 that allows users to view the quantity and type of staples 116 within the device. The handle or upper portion 110 of the device 100 also features a hammer 112, magazine or reservoir 113, spring 114, and pusher or plunger 115. The spring 114 furthers the pusher 115 to push staples 116 within the magazine or reservoir 113 towards the hammer 112.

The apparel fastening tool 100 has a lower portion or base 120, featuring movable bars or arms 121, a receiving area 122 with pads for holding the button or fastener and the pads may be rubber or silicone to provide a gripping area, and a crimper 124. The movable bars 121 feature a crescent-shaped receiving area 122 to hold different sizes of buttons or other fasteners 123 in place to be reattached. The crimper 124 crimps the staples 116 and, where a heated crimper is used, to seal the staple to the button or other fastener, to be closed inside the garment after they have passed through the buttons 123 and garment. In summary, the handle or upper portion 110 is compressed towards the base 120, and a staple 116 is driven through a button 123 and garment below, and the staple is crimped closed by the crimper 124, completing the repair.

Figure 2:
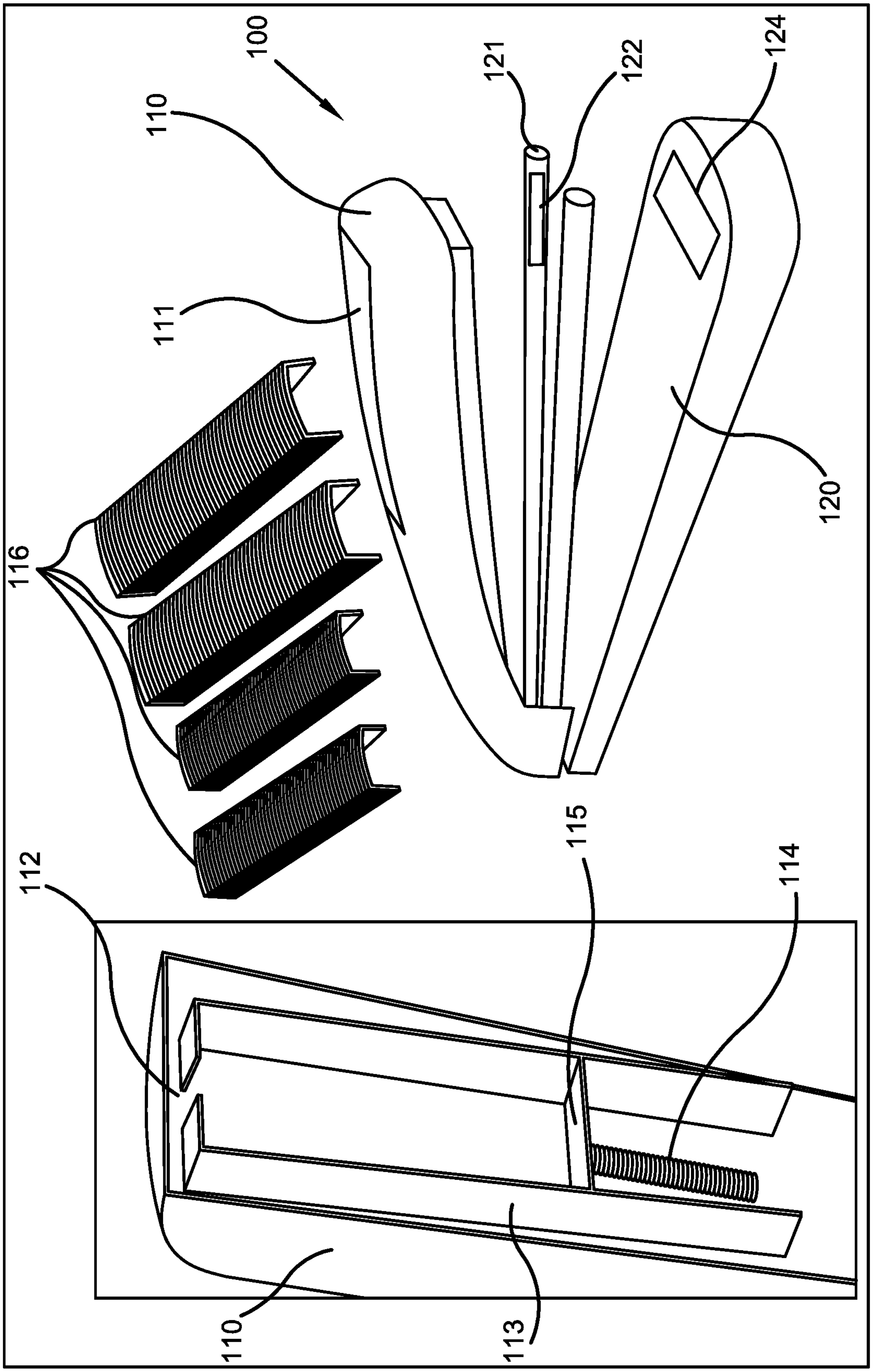
FIG. 2 illustrates a perspective view of one potential embodiment of the apparel repair tool of the present invention, showing the adjustability of the magazine to accommodate different sizes of staples or other fasteners for different sizes of buttons in accordance with the disclosed specification.

FIG. 2 illustrates a perspective view of one embodiment of the apparel repair tool 100 of the present invention, showing the adjustability of the magazine 113 to accommodate different sizes of staples or fasteners 116 for different sizes of buttons 123 in accordance with the disclosed specification. The device 100 features different sizes, colors, and textures of staples 116 that resemble different variations of thread on the garments to be repaired, allowing for an unnoticeable repair. Different sizes of staples 116 are also needed to replace different sizes of buttons 123, as the arms of the staples 116 will be passed through the holes of the buttons 123, which may be of varying distances apart depending on the size of the buttons or fasteners 123. FIG. 2 also illustrates the opening and closing motion used to actuate the button stapler 100.

Figure 3:
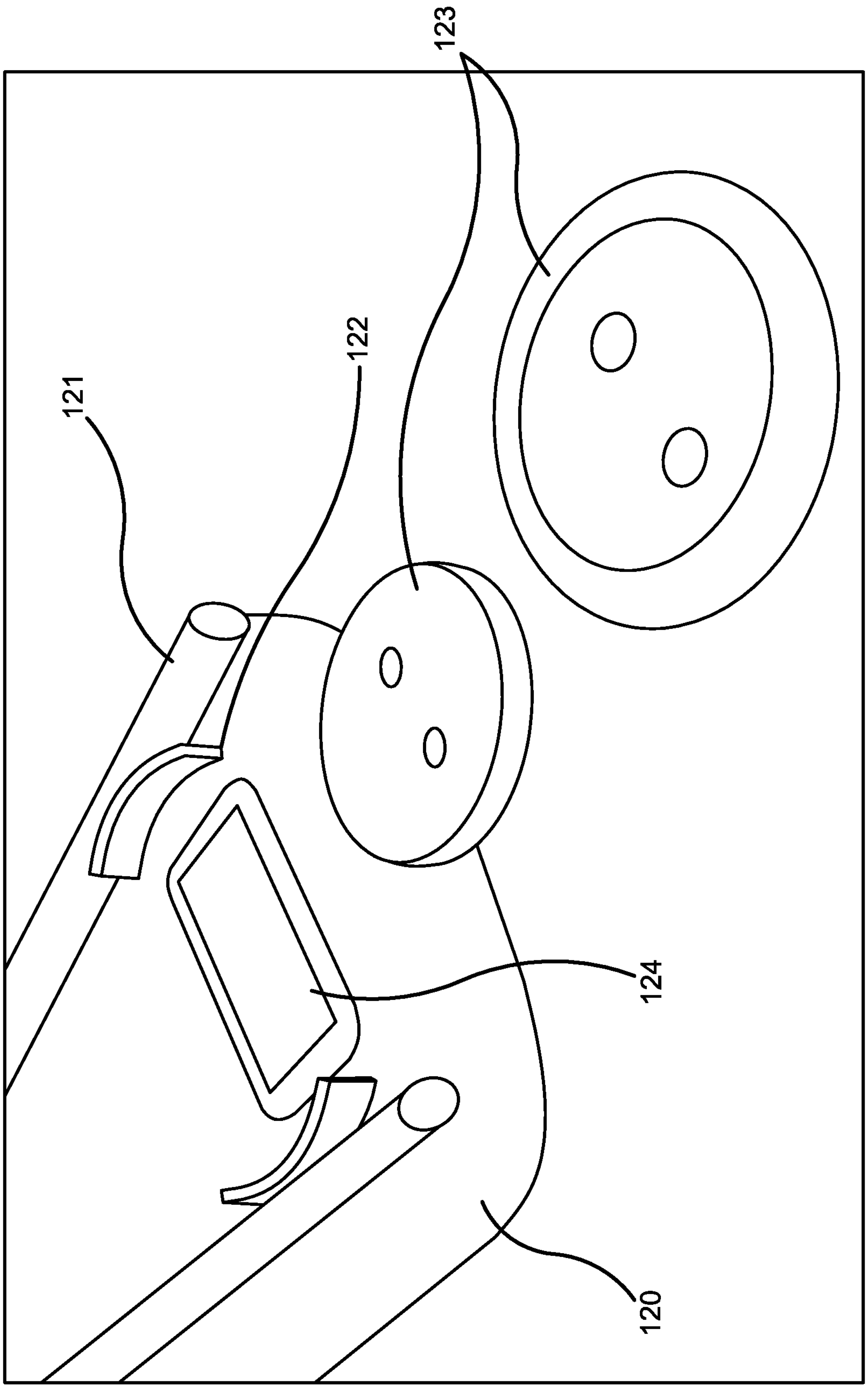
FIG. 3 illustrates a perspective view of one potential embodiment of the process of loading buttons or other items into the button receiving area and the adjustable bars or arms in accordance with the disclosed specification.

FIG. 3 illustrates a perspective view of one embodiment of the process of loading buttons or other fasteners 123 into the receiving area 122 with pads for holding the button or fastener and the pads may be rubber or silicone to provide a gripping area in accordance with the disclosed specification. The adjustability of the movable bars or arms 121 to accommodate different sizes of buttons or fasteners 123 is also shown. Buttons 123 are placed into the crescent-shaped receiving area 122 where they are held in place until the apparel repair tool 100 is actuated. The receiving area 122 with pads, for holding the button or fastener and the pads may be rubber or silicone to provide a gripping area, is found between two movable bars or arms 121 that adjust up or down and/or side to side to accommodate different sizes of buttons or fasteners 123. Also shown in FIG. 3 is the crimper 124 found on the lower portion, component or base 120. The crimper 124 is similar in design to that of a traditional paper stapler, closing the staples 116 once the handle 110 is compressed. The crimper 124 may be heated to fuse plastic or other thermoformable materials to the button or other fastener to help secure the staple to the button and the garment.

Figure 4:
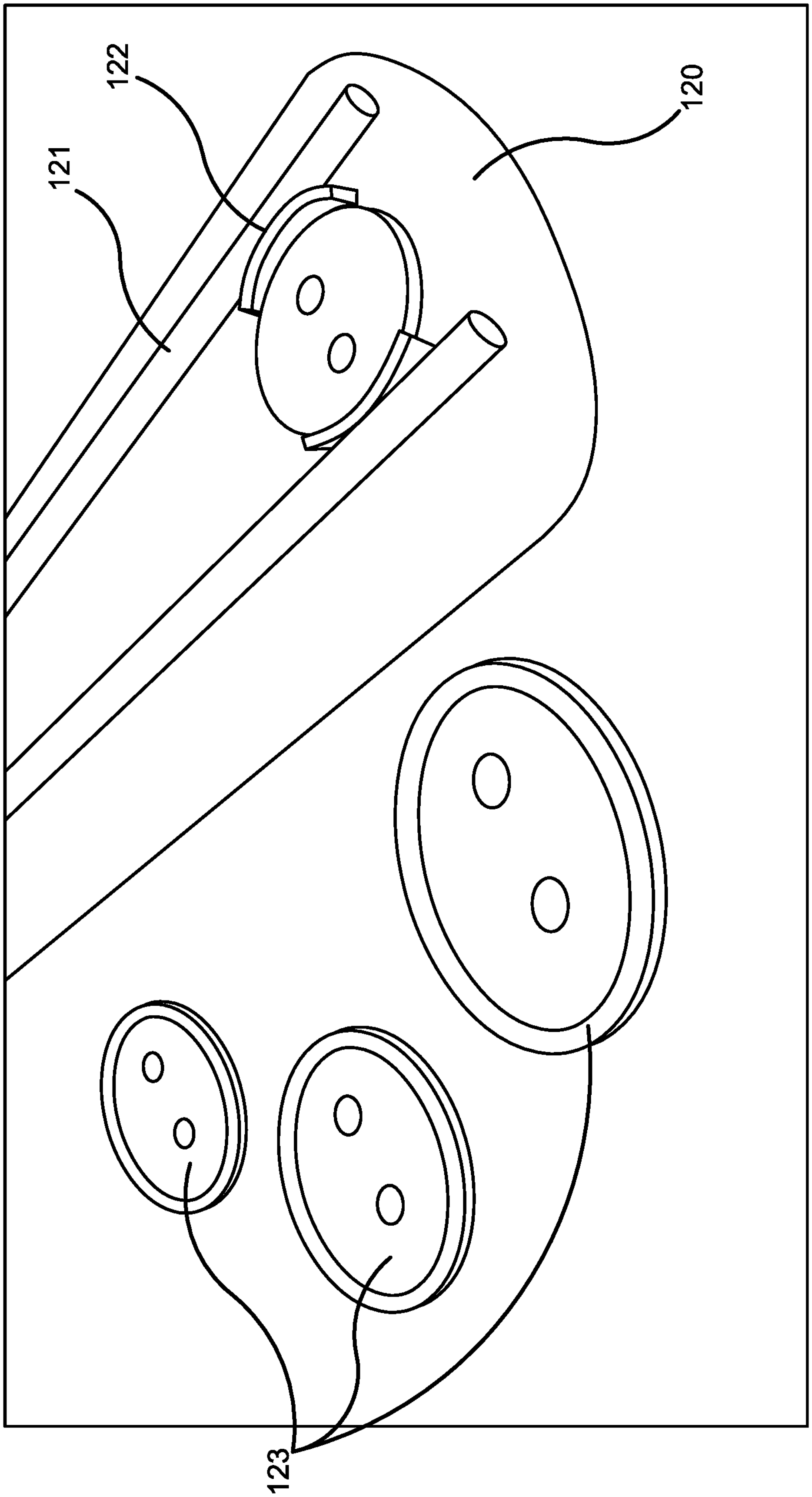
FIG. 4 illustrates a perspective view of one potential embodiment of the apparel repair tool of the present invention holding different sizes of buttons in accordance with the disclosed specification.

FIG. 4 illustrates a perspective view of one embodiment of the apparel repair tool 100 of the present invention holding different sizes of buttons or other items 123 in accordance with the disclosed specification. The crescent shape of the receiving area 122 found on the movable bars 121 is shown, holding the curved edge of the button 123. Examples of multiple sizes and colors of buttons 123 are also depicted.

Figure 5:
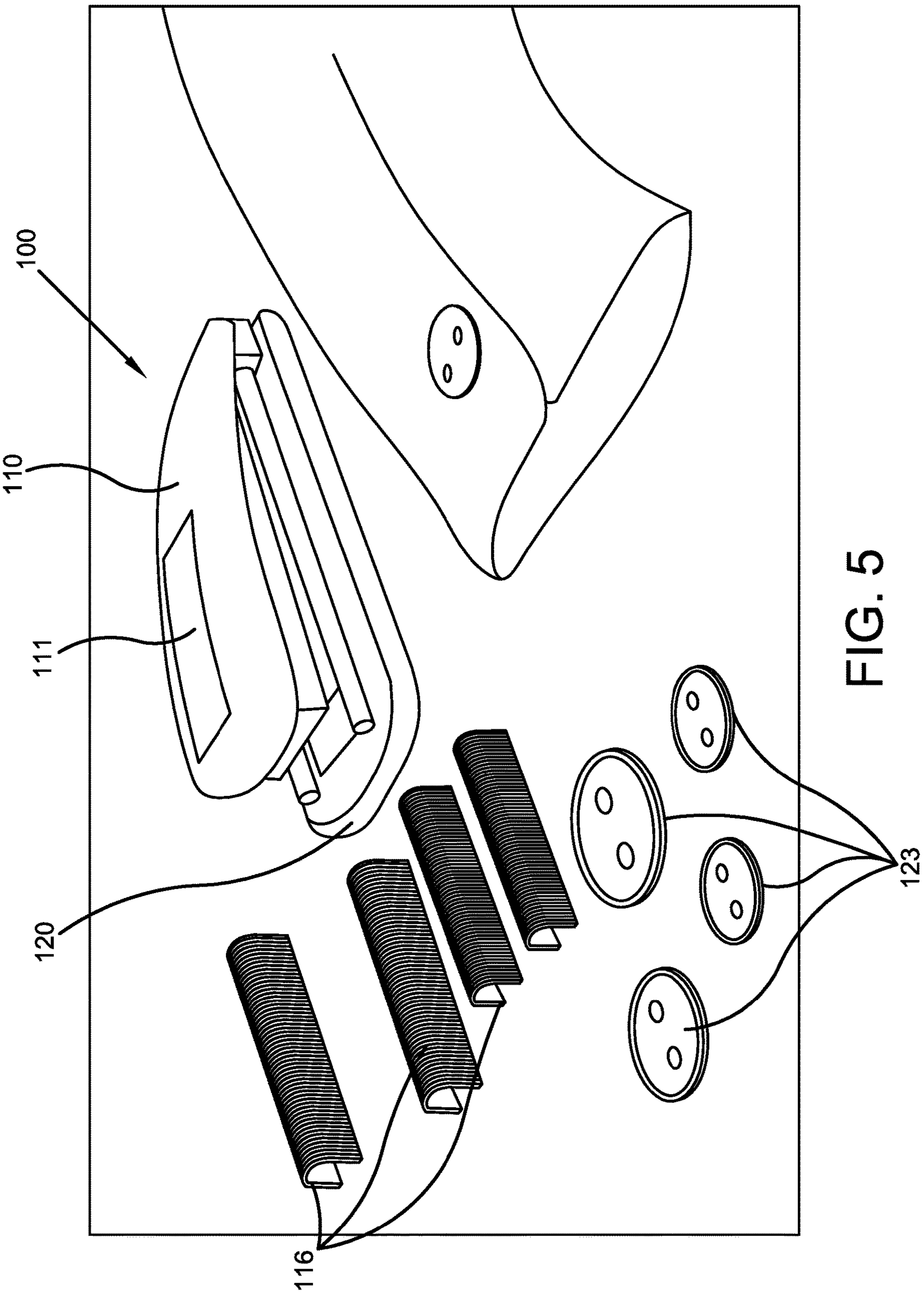
FIG. 5 illustrates a perspective view of one potential embodiment of the apparel repair tool and staples of the present invention in accordance with the disclosed specification.

FIG. 5 illustrates a perspective view of one embodiment of the apparel repair tool 100 and staples 116 of the present invention in accordance with the disclosed specification. A repaired garment sleeve and various buttons 123 are also shown.

Figure 6:
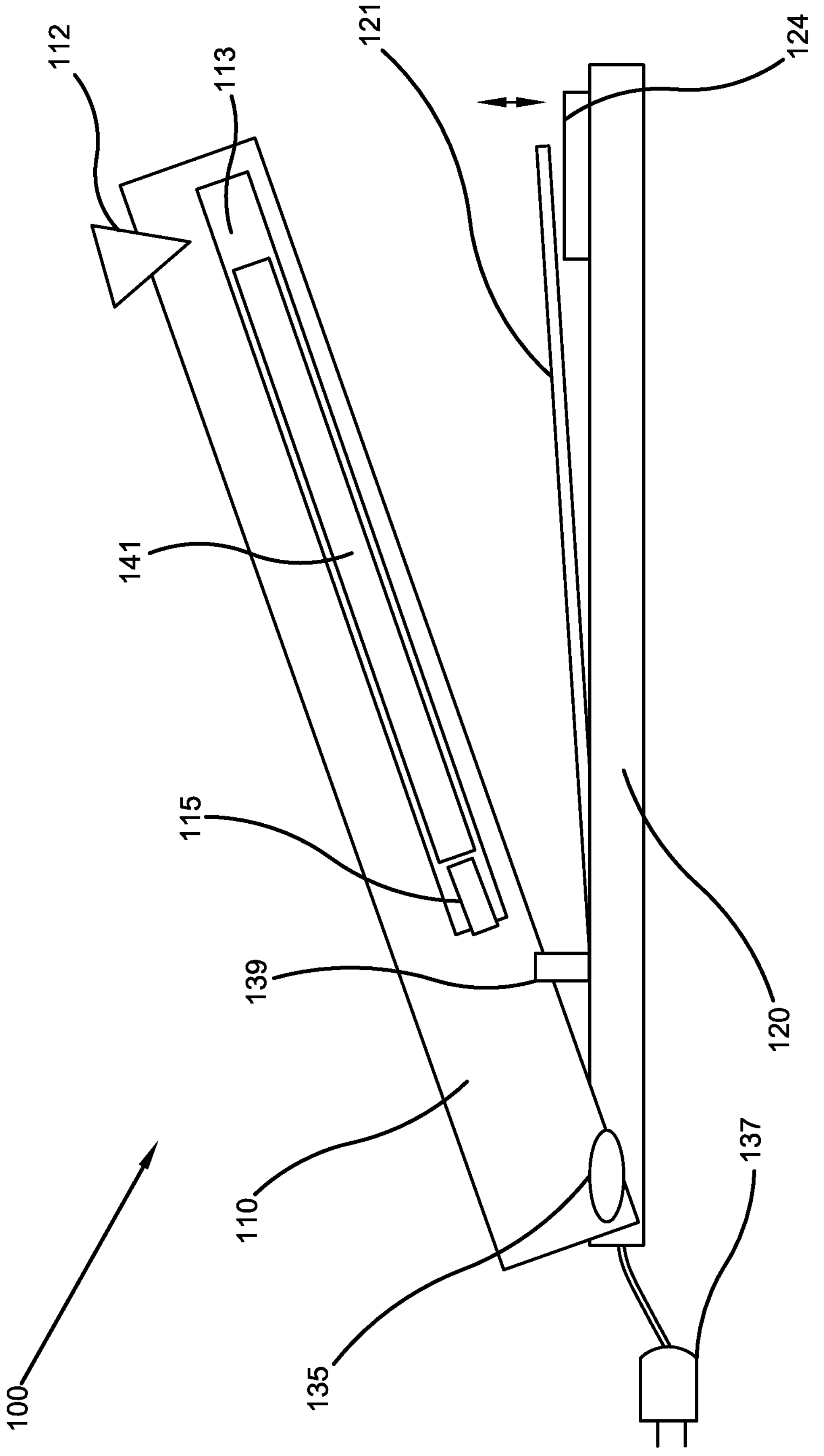
FIG. 6 illustrates a perspective and enlarged view of one potential embodiment of the apparel repair tool of the present invention in accordance with the disclosed architecture.

FIG. 6 is an exploded view of the apparel repair tool 100 which includes the upper component 110 and the lower component 120. Attached to the lower component 120 are the moveable arms 121 which may move up and down and side to side in order to hold a button or other item in position below the hammer 122 over the anvil or crimper 124 which may be heated and is attached to a power source 137, which may be a plug connecting to the house or office power or to a battery source. The movable arms 121 are able to accommodate a button or other fastener ranging from about ¼" to 2" and a height from ¼" to 1". The upper component 110 is movably connected to the lower portion 120 of the tool 100 by a hinge 135 and spring 139. The upper portion 110 has a reservoir 113 which is filled with a supply of staples or other fasteners 141.

Figure 7:
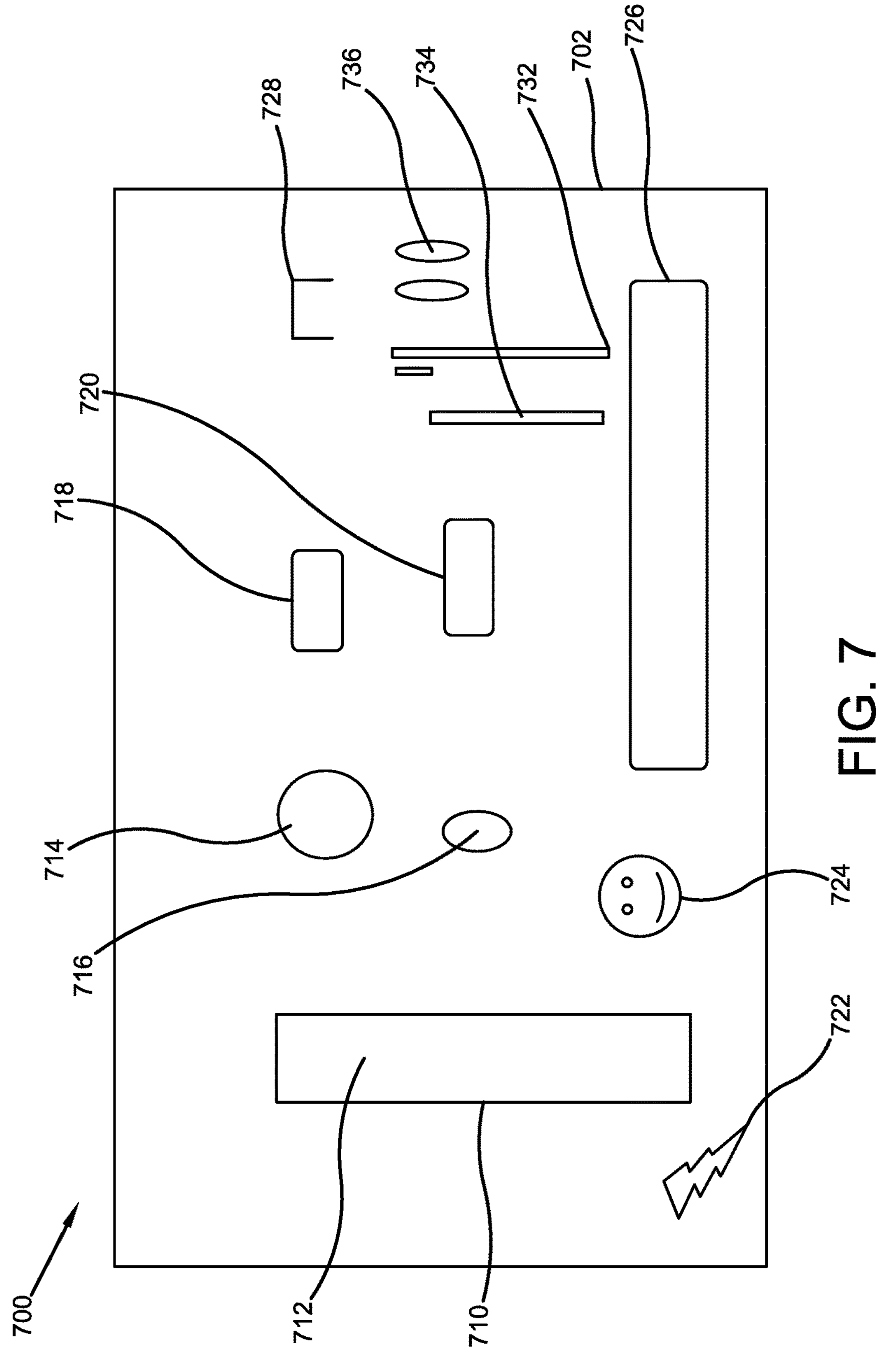
FIG. 7 illustrates a perspective view of one potential embodiment of a kit containing the apparel repair tool of the present invention in accordance with the disclosed architecture.

FIG. 7 shows a kit 700 which includes a package 702 configured for at least one of retail or on-line sales. The package 702 includes the apparel repair tool 710 which has a transparent window 712 which can be used to check on the type and color of the staples and/or fasteners held in the reservoir as discussed above. The kit 700 is provided with a number of different types and sizes of buttons 714 and 716. The kit 700 also includes other closures 718 and 720 such as snaps, clasps, zippers or other items that may be used as garment closures. The package 702 may also be provided with other adornments 722 and 724 to accessorize apparel and garments. The kit 700 has a supply of staples or other fasteners 726 and 728. The package 702 also provides a supply of different sized arms 732 and 734 as well as a supply of different sized gripping areas 736 to be used with the different sized arms or to replace gripping areas on the movable arms.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "button stapler", "clothing repair tool", and "device" are interchangeable and refer to the button stapler 100 of the present invention.

Notwithstanding the foregoing, the button stapler 100 of the present invention can be of any suitable size and configuration as is known in the art without affecting the overall concept of the invention, provided that it accomplishes the above-stated objectives. One of ordinary skill in the art will appreciate that the button stapler 100 as shown in FIGS. 1-7 is for illustrative purposes only, and that many other sizes and shapes of the apparel repair tool 100 are well within the scope of the present disclosure. Although the dimensions of the button stapler 100 are important design parameters for user convenience, the apparel repair tool 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparel repair tool comprising:

an upper component;

a lower component, wherein the upper and lower components are movably connected to one another at a hinge;

a spring;

a reservoir containing a plurality of fasteners positioned on the upper component;

a crimping plate positioned on the lower component;

a transparent window for viewing a type and quantity of the plurality of fasteners contained in the reservoir;

a pair of moveable arms coupled to the lower component; and a crescent-shaped receiving area positioned on each movable arm and adapted to securely hold a button, a clasp, a snap, or an adornment using a gripping pad;

wherein the pair of movable arms are configured to move up and down and side to side to accommodate buttons, clasps, snaps, or adornments having a width between ¼" and 2" and a height between ¼" and 1", and wherein the pair of movable arms are configured to hold the button, the clasp, the snap, or the adornment in position below a hammer and over the crimping plate.

2. The apparel repair tool as recited in claim 1, wherein the crimping plate is heated.

3. The apparel repair tool as recited in claim 2, wherein the plurality of fasteners are comprised of a plastic or a thermoformable material.

4. The apparel repair tool as recited in claim 2 further comprising a power source for heating the crimping plate.

5. The apparel repair tool as recited in claim 4, wherein the power source is one of a battery or an electrical power cord.

6. The apparel repair tool as recited in claim 1, wherein each gripping pad is comprised of a rubber or a silicone.

7. A button stapler comprising:

a tool for affixing a button to an apparel or garment, wherein the tool comprises an upper component with a reservoir, a lower component, and a crimping plate, and further wherein the upper component and the lower component are repositionably connected to one another by a hinge and a spring;

a supply of fasteners contained within the reservoir in the upper component;

a pair of movable arms connected to the lower component, wherein the pair of movable arms are sized and configured for holding the button for fixing to the apparel or garment; and a crescent-shaped receiving area positioned on each movable arm and adapted to securely hold the button using a gripping pad;

wherein the pair of movable arms are configured to move up and down and side to side to accommodate buttons having a width between ¼" and 2" and a height between ¼" and 1", and wherein the pair of movable arms are configured to hold the button in position below a hammer and over the crimping plate.

8. The button stapler as recited in claim 7, wherein the gripping pad is made from a silicone or a rubber.

9. The button stapler as recited in claim 7, wherein the upper component further comprises a transparent window for viewing into the reservoir.

* * * * *